US008649265B2

(12) United States Patent
Song et al.

(10) Patent No.: US 8,649,265 B2
(45) Date of Patent: Feb. 11, 2014

(54) LOW POWER AND FAST APPLICATION SERVICE TRANSMISSION

(75) Inventors: Jiqiang Song, Beijing (CN); Dawei Wang, Beijing (CN); Leibo Liu, Beijing (CN); Eugene Tang, Beijing (CN); Shouyi Yin, Beijing (CN)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 13/260,106

(22) PCT Filed: Aug. 24, 2010

(86) PCT No.: PCT/CN2010/076289
§ 371 (c)(1),
(2), (4) Date: Nov. 14, 2011

(87) PCT Pub. No.: WO2011/023096
PCT Pub. Date: Mar. 3, 2011

(65) Prior Publication Data
US 2012/0140623 A1  Jun. 7, 2012

(30) Foreign Application Priority Data

Aug. 24, 2009  (CN) .......................... 2009 1 0170474
Aug. 24, 2009  (CN) .......................... 2009 1 0170475

(51) Int. Cl.
*H04W 28/06* (2009.01)

(52) U.S. Cl.
USPC ...................................................... 370/230.1

(58) Field of Classification Search
USPC .................. 370/229–240, 310–350
See application file for complete search history.

(56) References Cited

U.S. PATENT DOCUMENTS

| 8,351,327 B1* | 1/2013 | Binns ............................. 370/229 |
| 2003/0037154 A1* | 2/2003 | Poggio et al. ................. 709/230 |
| 2004/0151114 A1* | 8/2004 | Ruutu ............................ 370/230 |
| 2004/0172464 A1* | 9/2004 | Nag ............................... 709/223 |
| 2009/0191858 A1* | 7/2009 | Calisti et al. ............... 455/422.1 |

FOREIGN PATENT DOCUMENTS

| CN | 1726671 A | 1/2006 |
| JP | 2007-104605 | 4/2007 |
| WO | 2008099388 A2 | 8/2008 |

OTHER PUBLICATIONS

Ang, Boon S., "An Evaluation of an Attempt at Offloading TCP/IP Protocol Processing on to an i9 60RN-based iNIC," Computer Systems and Technology Laboratory, HP Laboratories, Palo Alto, California, H PL-2001-8, Jan. 9, 2011, 33 pages.
Poellabauer, C. et al., "Energy-Aware Traffic Shaping for Wireless Real-Time Applications," Proceedings of the 10th IEEE Real-Time and Embedded Technology and Applications Symposium (RTAS '04), May 25-28, 2004, Toronto, Canada, 8 pages.
International Search Report and Written Opinion for PCT/CN2010/076289, mailed Dec. 16, 2010, 7 pages.

(Continued)

*Primary Examiner* — Ricky Ngo
*Assistant Examiner* — Wei-Po Kao
(74) *Attorney, Agent, or Firm* — Schwabe, Williamson & Wyatt, P.C.

(57) ABSTRACT

An apparatus, method and system are provided to allow a low power and fast application service transmission (LP-FAST) engine to enhance the quality of service (QoS) and optimize the power consumption of the mobile applications operating in a mobile terminal in a service-aware, bandwidth-aware and power-consumption-aware manner.

11 Claims, 6 Drawing Sheets

(56) References Cited

OTHER PUBLICATIONS

International Preliminary Report on Patentability for PCT/CN2010/076289, issued Feb. 28, 2012, 2 pages.

Office Action mailed Mar. 12, 2013 for Japanese Application No. 2012-514340, 3 pages.
Office Action mailed Apr. 29, 2013 for Korean Application 2011-7031681. 1 page.

* cited by examiner

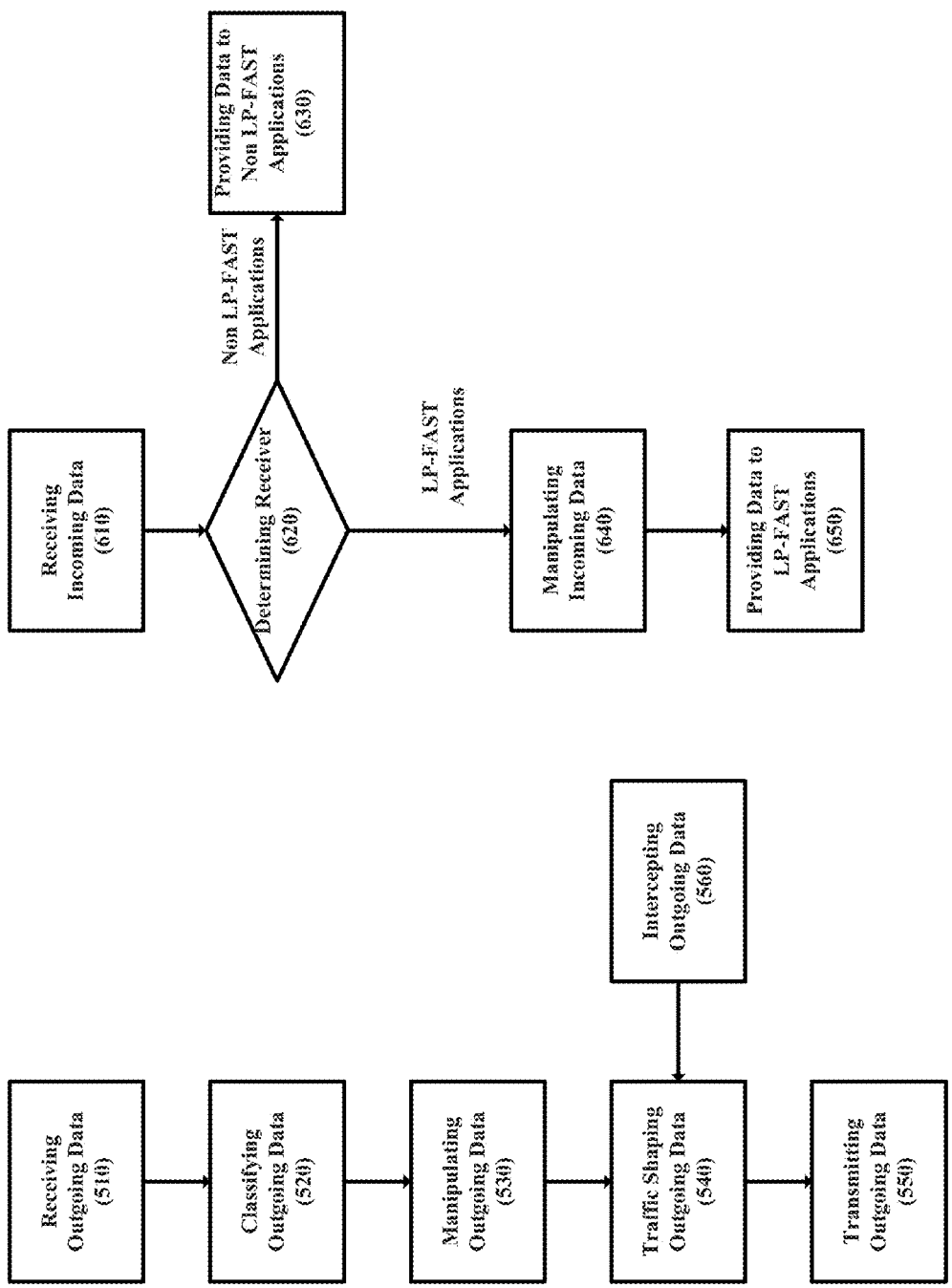

LOW POWER AND FAST APPLICATION SERVICE TRANSMISSION

CROSS REFERENCE TO RELATED APPLICATIONS

The present application claims priority to CN Application No. 200910170474.X filed Aug. 24, 2009, and CN Application No. 200910170475.4 filed Aug. 24, 2009. The contents of these two applications are hereby incorporated by reference.

TECHNICAL FIELD

The present disclosure generally relates to mobile communications, in particular, to low power and fast application service transmissions in mobile communications.

BACKGROUND

With the development of mobile computing, mobile terminals are shifting from mainly consuming content (i.e., downloading) to also creating a significant amount of content (i.e., uploading). Different mobile applications may have different Quality of Service (QoS) parameters. For example, a video conferencing application may prefer transmission of data instantly or in near real-time, but a video streaming application may be able to tolerate certain amount of delay in transmission due to caching or buffering. Network components, e.g., gateways and routers, may be able to inspect packets to/from these applications, differentiate different QoS parameters, and process the packets to/from different mobile applications differently. However, on the mobile terminal side, the QoS parameters of different mobile applications may not be well integrated into the transmission stacks. This is because many mobile terminals use transmission stacks originally designed for computers with direct connections to wired networks, which may not be efficient or power-savvy for wireless access networks. Examples of these transmission stacks may include the Open Systems Interconnection (OSI) model and the Transport Control Protocol/Internet Protocol (TCP/IP) model, in which data generated by the upper layer applications are encapsulated by various lower layers of the transmission stacks. Because of the encapsulation, the lower layers of the transmission stacks (e.g., the IP layer and/or the link layer) may not be able to differentiate packets to/from different applications that have different QoS parameters. Consequently, packets with higher priorities may get delivered to/from the network/applications behind packets with lower priorities. As a result, the QoS of the applications may suffer.

Moreover, for today's mobile terminals, although computation and transmission may remain to be the two major power consumption sources, transmission may account for more power usage than computation, especially for the mobile applications that utilizes online services. However, the traditional transmission stacks may not be fully optimized to save power while maintaining the QoS. This mismatch may cause unsatisfactory, or even frustrating, user experience when accessing online services in wireless access networks. Some mobile terminals may try to alleviate such problem by dropping connections immediately after each data transmission to save power. However, frequent connect/disconnect may congest the signaling channels, which in turn may lead to more connection failures.

There have been several partial solutions that use application-transparent traffic shaping methods to reduce transmission power consumption. However, these methods in general may only address the lower layers of the transmission stacks. Furthermore, these methods may not provide a mechanism for the mobile applications to communicate their QoS parameters to all the layers of the transmission stacks. Therefore, the savings afforded by these solutions are usually modest.

There have also been several hardware based network stack implementations designed to reduce the central processing unit (CPU) workload from the software-based transmission stacks, such as TCP offload engines (TOE). However, the transmission data rate on mobile terminals may not be high enough to cause the increase of processor usage due to software-based transmission stacks to become a major bottleneck of the system. Therefore, solutions such as TOE that accelerates the software transmission stacks by hardware may not be effective for mobile terminals.

BRIEF DESCRIPTION OF THE DRAWINGS

Embodiments of the present disclosure will be described by way of exemplary illustrations, but not limitations, shown in the accompanying drawings in which like references denote similar elements, and in which:

FIG. 5 is a flow diagram illustrating a portion of an example operation of the LP-FAST engine processing the outgoing data in accordance with various embodiments;

FIG. 6 is a flow diagram illustrating a portion of an example operation of the LP-FAST engine processing the incoming data in accordance with various embodiments;

DETAILED DESCRIPTION OF ILLUSTRATIVE EMBODIMENTS

Figure 1:
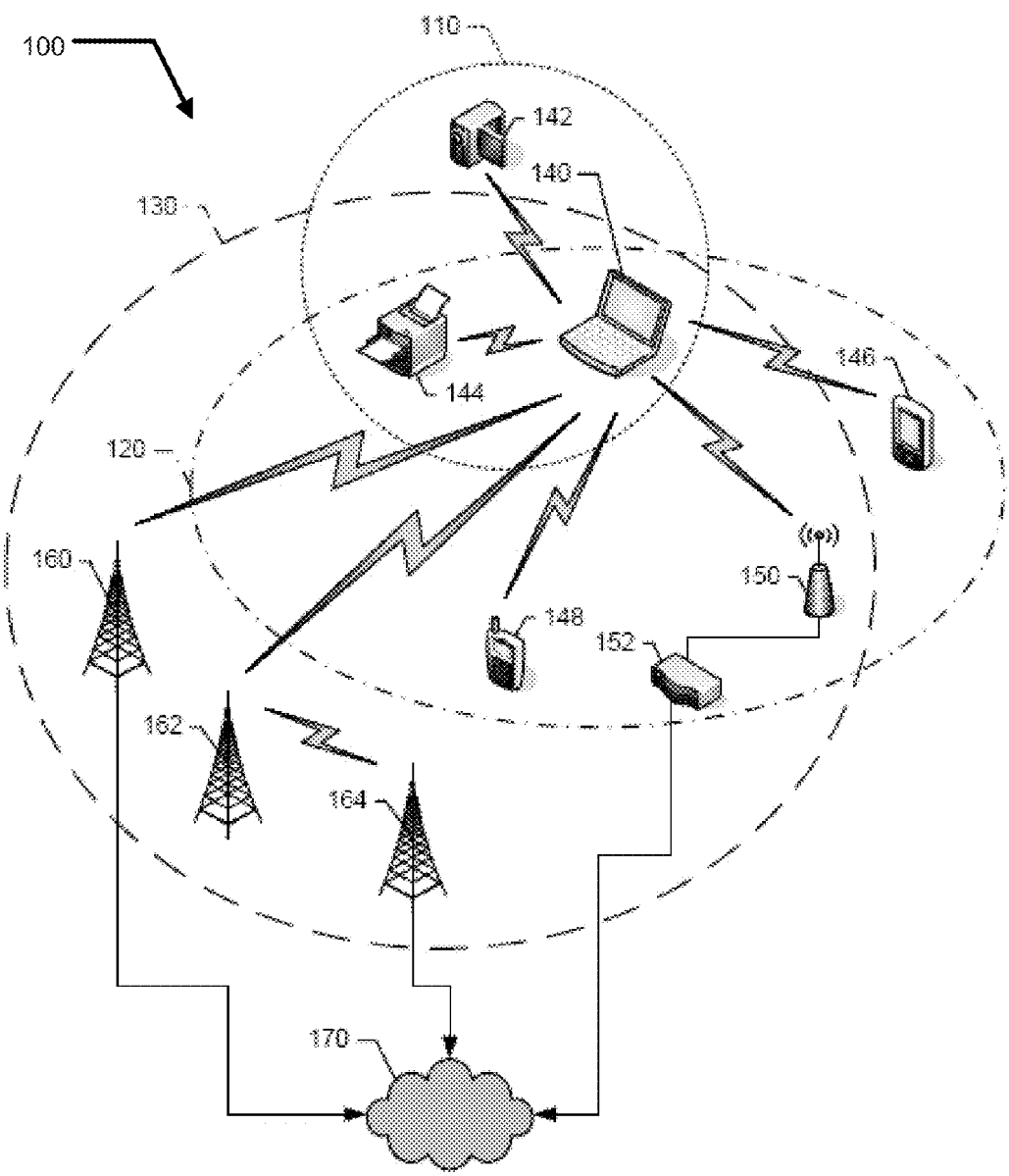
FIG. 1 illustrates an example wireless communication system in accordance with various embodiments.

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

In addition, the term "data," as used with respect to various embodiments of the present invention, loosely refers to data generated by various applications prior to being processed by the transmission stack, or data in a form that is readily consumable by the applications after processed by the transmission stack, unless specified otherwise. The term "packet," as used with respect to various embodiments of the present invention, loosely refers to data being transmitted in each stage of the transmission stacks between the mobile applications and the wireless network, unless specified otherwise. A "packet" may travel through one or more components of a mobile terminal, and may be modified by the one or more components of the mobile terminal, before reaching its destination. The terms "flow," "data flow," "stream," or "data stream," as used with respect to embodiments of the present invention, are also synonymous, unless specified otherwise.

Mobile applications operating on a mobile terminal may engage in communication patterns that are either one-way, e.g., video streaming, or bi-directional, e.g., remote services for speech recognition. The behaviors of various mobile applications may be different depending on their communication patterns. In order to create an optimal user experience on the mobile terminal, it may be important for the transmission stack to be aware of the service characteristics of the mobile applications. These service characteristics may include service types, outgoing data (data generated by the mobile applications to be transmitted over the wireless network) types, incoming data (data received from the wireless network designated for the mobile applications) types, data manipulation flags, priority levels, acceptable latencies, target data rates, etc, which may generally be referred to as quality of service (QoS) parameters.

According to various embodiments, methods, apparatuses and systems are provided in this disclosure to allow a Low Power and Fast Application Service Transmission (LP-FAST) engine to enhance the QoS and reduce power consumption of the mobile applications operating in a mobile terminal in a service-aware, bandwidth-aware and power-consumption-aware manner.

FIG. 1 illustrates an example wireless communication system in accordance with various embodiments. A wireless communication system 100 may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication networks 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), a set-top box, and/or other suitable relatively stationary, portable, or mobile electronic devices. Although FIG. 1 depicts five subscriber stations, the wireless communication system 100 may include more or less subscriber stations.

The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), orthogonal frequency division multiple access (OFDMA), and/or other suitable modulation techniques to communicate via wireless links. In one example, the station 146, which may also be referred to as handheld computer 146, may operate in accordance with suitable wireless communication protocols that require very low power such as Bluetooth®, ultra-wide band (UWB), and/or radio frequency identification (RFID) to implement the WPAN 110. In particular, the subscriber stations 140, 142, 144, 146, and 148 may communicate with devices associated with the WPAN 110 such as station 142, which may also be referred to as a video camera 142, and/or station 144, which may also be referred to as printer 144, via wireless links.

In another example, the handheld computer 146 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the handheld computer 146 may communicate with devices associated with the WLAN 120 such as the printer 144, the station 140, which may also be referred to as laptop computer 140, and/or station 148, which may also be referred to as smart phone 148, via wireless links. The handheld computer 146 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The handheld computer 146 may use OFDM modulation to transmit large amounts of digital data by splitting a radio frequency signal into multiple small sub-signals, which in turn, are transmitted simultaneously at different frequencies. In particular, the handheld computer 146 may use OFDM modulation to implement the WMAN 130. For example, the handheld computer 146 may operate in accordance with the 802.16 family of standards developed by IEEE to provide for fixed, portable, and/or mobile broadband wireless access (BWA) networks (e.g., the IEEE std. 802.16-2004, the IEEE std. 802.16e, etc.) to communicate with base stations, generally shown as 160, 162, and 164, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, WiMAX Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The handheld computer 146 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High Speed Packet Access (HSPA) technology, Long Term Evolution (LTE) technology, standards based on these technologies, variations and evolutions of these standards, and/or other suitable wireless communication standards. Further, the wireless communication system 100 may include a wireless mesh network. Although FIG. 1 depicts a WPAN, a WLAN, and a WMAN, the wireless communication system 100 may include other combinations of WPANs, WLANs, WMANs, WWANs, and/or mesh networks. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
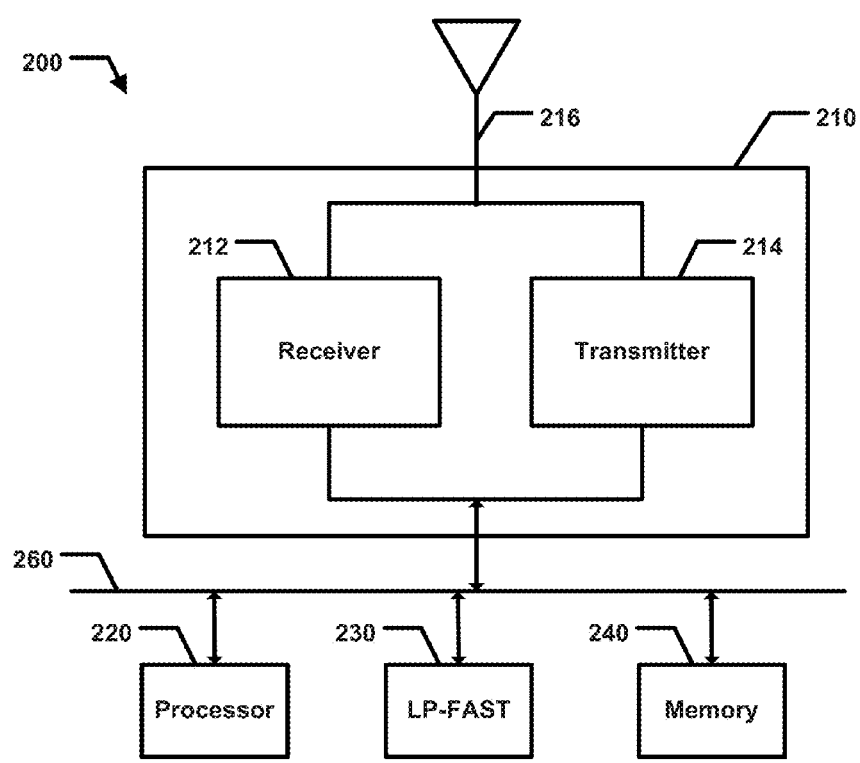
FIG. 2 is a block diagram illustrating an example embodiment of a mobile terminal in accordance with various embodiments.

FIG. 2 is a block diagram illustrating an example embodiment of a mobile terminal 200 in accordance with various embodiments. In various embodiments, the mobile terminal 200 may be one of the subscriber stations 140, 142, 144, 146 and 148 illustrated in FIG. 1.

In various embodiments, the mobile terminal 200 may have a body dimensioned to enable portable usage of the mobile terminal 200 as a client device. The mobile terminal 200 may include a communication interface 210, a processor 220, a low power fast application service transmission (LP-FAST) engine 230, and a memory 240. Although FIG. 2 depicts components of the mobile terminal 200 coupling to each other via a bus 260, these components may be operatively coupled to each other via other suitable direct or indirect connections (e.g., a point-to-point connection or a point-to-multiple point connection).

Briefly, in various embodiments, the communication interface 210 (e.g., a radio-frequency (RF) physical-layer (PHY) sub-system) may include a receiver 212, a transmitter 214, and an antenna 216. The communication interface 210 may receive and/or transmit data via the receiver 212 and the transmitter 214, respectively. The antenna 216 may include one or more directional or omni-directional antennas such as dipole antennas, monopole antennas, patch antennas, loop antennas, microstrip antennas, and/or other types of antennas suitable for transmission of RF signals. Although FIG. 2 depicts a single antenna, the mobile terminal 200 may include additional antennas. For example, the mobile terminal 200 may include a plurality of antennas to implement a multiple-input-multiple-output (MIMO) system.

While FIG. 2 depicts particular components, the mobile terminal 200 may include other suitable components to operate within a wireless communication network. For example, the mobile terminal 200 may include a bus interface controller that is coupled to the bus 260. Further, although the components shown in FIG. 2 are depicted as separate blocks within the station 200, the functions performed by some of these blocks may be integrated within a single semiconductor circuit or may be implemented using two or more separate integrated circuits. For example, although the receiver 212 and the transmitter 214 are depicted as separate blocks within the communication interface 210, the receiver 212 may be integrated into the transmitter 214 (e.g., a transceiver).

Figure 3:
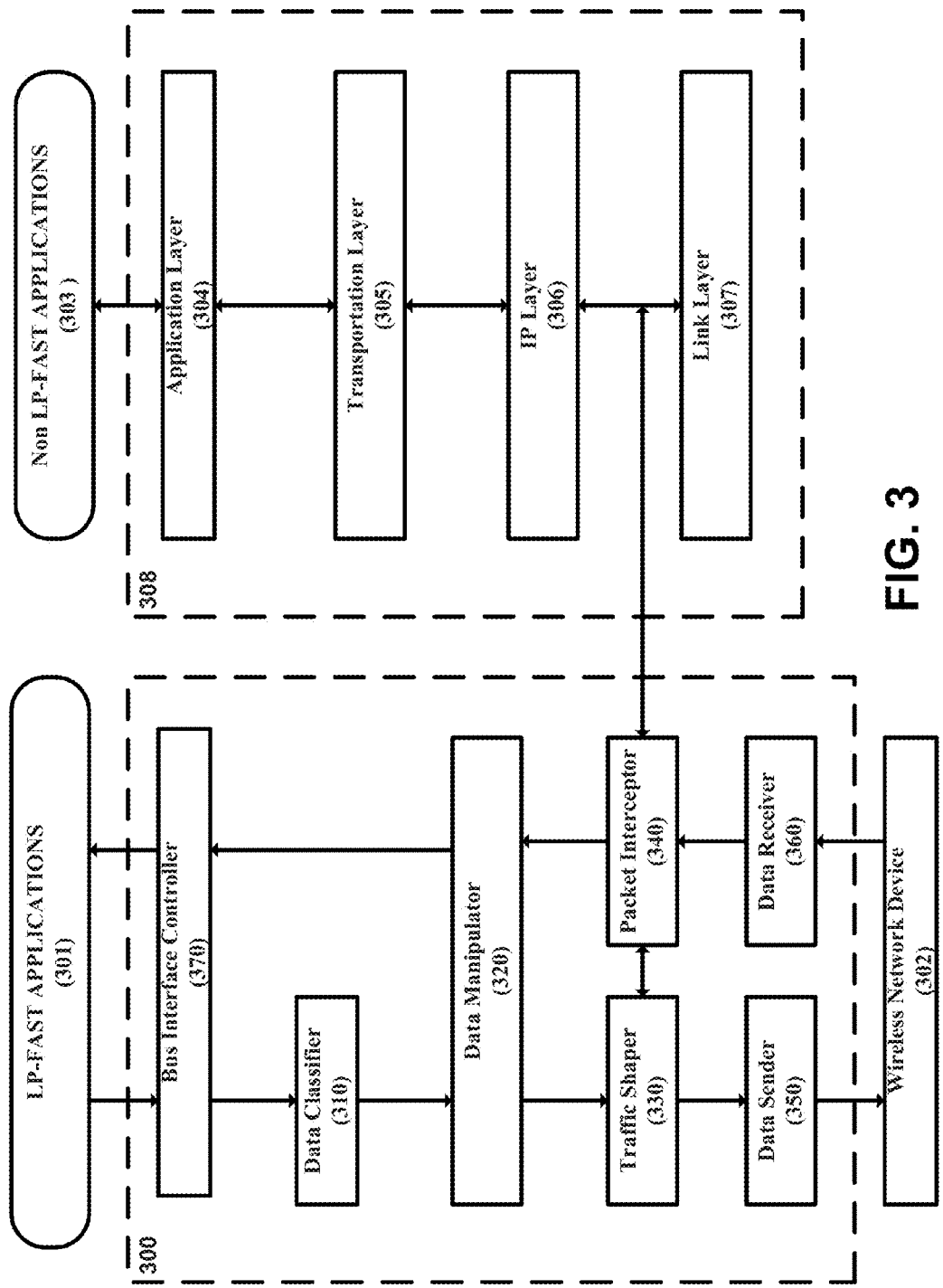
FIG. 3 is a block diagram illustrating a LP-FAST engine and its interaction with mobile applications and external transmission stacks on a mobile terminal, in accordance with various embodiments.

FIG. 3 is a block diagram illustrating a LP-FAST engine 300 and its interaction with mobile applications and external transmission stacks on a mobile terminal, in accordance with various embodiments. In one example, the LP-FAST engine 300 may be the LP-FAST engine 230 illustrated in FIG. 2.

In various embodiments, the LP-FAST engine 300 may include a data classifier 310, a data manipulator 320, a traffic shaper 330, a packet interceptor 340, a data sender 350 and a data receiver 360, and an interface 370, such as a bus interface controller, an application programming interface (API), etc. While FIG. 3 depicts particular components, the LP-FAST engine 300 may include other suitable components to operate within a wireless communication network. While FIG. 3 only depicts particular couplings between various components of the LP-FAST engine 300, the LP-FAST engine 300 may contain additional couplings between various components. Although the components shown in FIG. 3 are depicted as separate blocks within the LP-FAST engine 300, the functions performed by some of these blocks may be integrated within a single semiconductor circuit or may be further subdivided into multiple components. Further, some of these components may be implemented in either hardware, software, or a combination of hardware and software.

In various embodiments, mobile applications operating on a mobile terminal may include applications that are designed to use the LP-FAST engine 300, referred to as LP-FAST applications 301, and applications that are not designed to use the LP-FAST engine 300, referred to as non LP-FAST applications 303.

In embodiments in which the interface 370 is an API, which may also be referred to as an LP-FAST API, the API may be provided to the LP-FAST application 301 to communicate with the LP-FAST engine 300. The LP-FAST API may allow the LP-FAST applications 301 to communicate with various components of the LP-FAST engine 300. The API may allow the LP-FAST applications 301 to control its behavior in at least two aspects: service manipulation and service description. Service manipulation aspects of the API may allow the LP-FAST applications 301 to create a service, start a service, modify a service, and stop a service, etc. Service description aspects of the API may allow the LP-FAST applications 301 to define the service parameters for a given service. Typical service parameters may include service type, outgoing data type, incoming data type, data manipulation flags, priority level, maximum acceptable latency, maximum data rate, or other information related to QoS parameter of the LP-FAST applications 301. In various embodiments, the API may allow the LP-FAST Applications 301 to specify information related to QoS parameters at the packet level, to enable the traffic shaper 330 to do both flow-based and in-flow QoS control. In various embodiments, the list of parameters of the API may be statically defined for a particular mobile platform or dynamically defined by the LP-FAST applications 301. The above list should not be construed as a limitation to the format or the parameters of the API.

In various embodiments, the LP-FAST applications 301 may communicate with various components of the LP-FAST engine 300 via the interface 370. While FIG. 3 depicts the interface 370 being a bus interface controller, in various embodiments, the LP-FAST engine 300 may or may not contain a bus interface controller. In various embodiments, the LP-FAST applications 301 may communicate with the LP-FAST engine 300 via other types of communication methods, such as shared memory.

In various embodiments, the data classifier 310 may receive outgoing application data generated by the LP-FAST applications 301 via the interface 370 or some other means. The data classifier 310 may classify the outgoing data based on the information related to the QoS parameters of the LP-FAST applications 301. The information related to the QoS parameters may be embedded in the application data itself or otherwise relayed to the data classifier 310 via some other mechanisms, such as via the interface 370. The data classifier 310 may classify and/or categorize the received application data into one or more service groups according to one or more classification criteria. Each service group may contain one or more data streams from one or more mobile applications. The data classifier 310 may configure classification criteria based on any packet classification scheme known to person(s) of ordinary skill in the art or any combination thereof. In one embodiment, the data classifier 310 may configure classification criteria based on acceleration scheme of the mobile applications. For example, a video conference application and a web search application may be classified into different service groups, while a video streaming application and a music streaming application may be classified into the same service group. In an alternative embodiment, the data classifier 310 may configure classification criteria based on classes of services that the LP-FAST applications 301 are trying to access, or assign weighted priorities to different types of services. For example, high priorities for data streams with low latency requirement and low priorities for data streams with best-effort delivery, etc.

In various embodiments, the data manipulator 320 may perform various operations on the incoming and/or outgoing packets/data according to data manipulation flags associated with the incoming/outgoing packets or the specific mobile application. These operations may include any of compression, decompression, encryption, decryption, packetization, depacketization, etc. Having the dedicated data manipulator 320 to perform these operations may reduce the main processor usage and associated memory operations, thereby reducing power consumption of the mobile terminal. The LP-FAST applications 301 may set all or part of the data manipulation flags via the API, such as encryption, decryption, compression and decompression. In various embodiments, the data manipulation flags may also be modified by components of the LP-FAST engine 300. For example, data manipulation flags for packetization and depacketization may be set by the data manipulator 320. The data manipulator 320 may perform each operation on an individual data stream, and/or multiple data streams.

In various embodiments, the data manipulator 320 may perform these operations in a context-aware fashion, i.e., service-aware, bandwidth-aware and/or power-consumption aware. The data manipulator 320 may be service aware by performing these operations based on the information related to the QoS parameters of the LP-FAST applications 301. The data manipulator 320 may be bandwidth-aware by performing these operations according to network bandwidth status feedback received from the traffic shaper 330. For example, when the available bandwidth is below a predetermined bandwidth threshold, the data manipulator 320 may reduce the transmission data rate of the LP-FAST Applications 301. The data manipulator 320 may be power-consumption aware by performing these operations according to feedback received from external power monitors (not shown in FIG. 3). For example, when the power supply is below a predetermined power threshold, the data manipulator 320 may reduce both computational resource consumption and transmission data rate. In various embodiments, the data manipulator 320 may make different adjustments on different data streams according to respective QoS level and priority of the different data streams.

Figure 4:
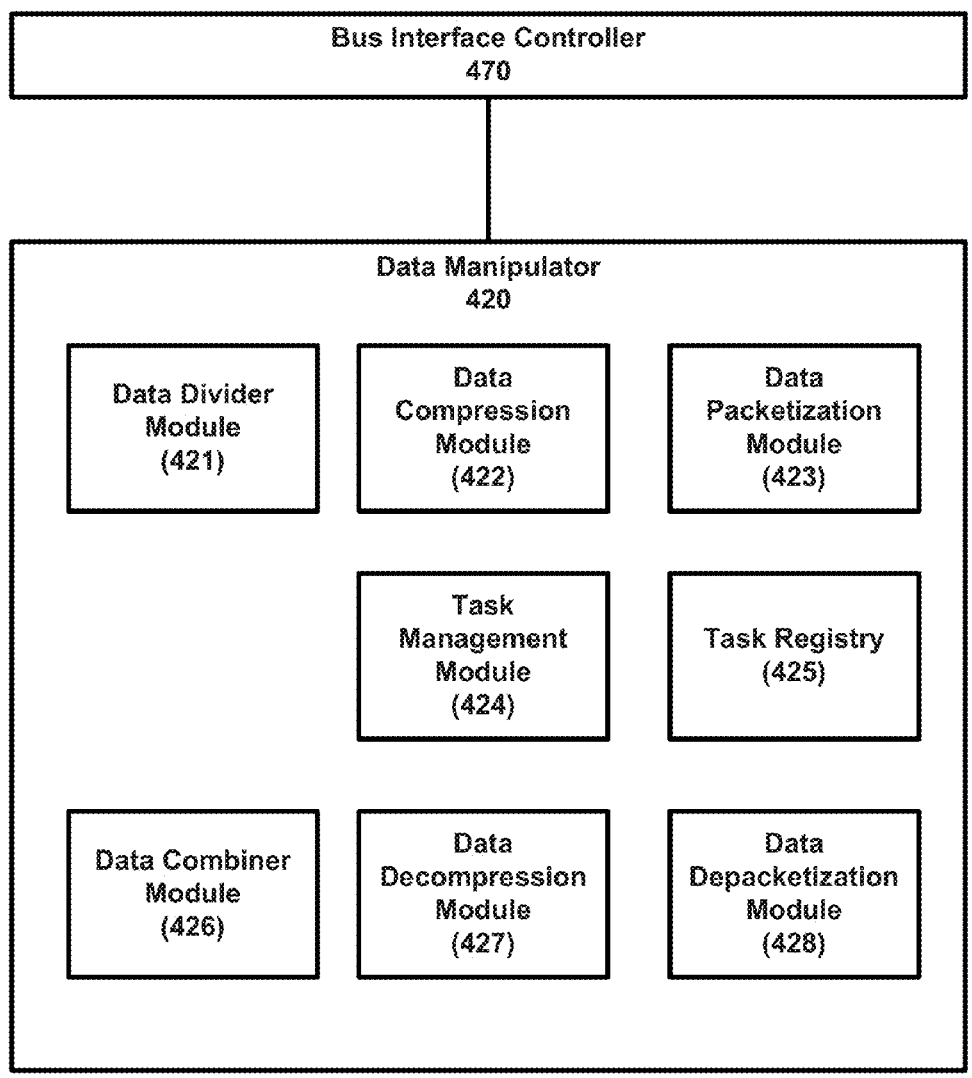
FIG. 4 is a block diagram illustrating an example embodiment of a data manipulator coupled to a bus interface controller in accordance with various embodiments.

FIG. 4 is a block diagram illustrating an example embodiment of a data manipulator 420 coupled to a bus interface controller 470 in accordance with various embodiments. In various embodiments, the data manipulator 420 may be the data manipulator 320 illustrated in FIG. 3. The data manipulator 420 may include a data divider module 421, a data compression module 422, a data packetization module 423, a data combiner module 426, a data decompression module 427, a data depacketization module 428, a task management module 424 and a task registry 425. Although FIG. 4 depicts particular components, the data manipulator 420 may include other suitable components, including one or more storage units, such as memory, buffers, caches, etc. Furthermore, functions performed by some of these components may be combined or further sub-divided, and some of these components may be implemented in software, hardware, or a combination thereof.

In various embodiments, the task management module 424 may receive a transmission command from the main processor via a bus interface controller 470 coupled to the main processor (not shown in FIG. 1) and the LP-FAST engine 300. The transmission command may contain information related to the outgoing data generated by the LP-FAST applications 301, which may include data manipulation flags set by the LP-FAST applications 301. In addition, the transmission command may contain information related to incoming data designated for LP-FAST applications 301 to be received from the wireless network. The task management module 424 may provide the transmission command to the task registry 425.

In various embodiments, the task registry 425 may receive the transmission command from the task management module 424, obtain the information related to the outgoing data generated by the LP-FAST applications 301 and/or information related to the incoming data to be received, and generate a transmission task.

In various embodiments, the data divider module 421 may detect, or otherwise be notified of, the generated transmission task and obtain the information related to the outgoing data via the task management module 424. The data divider module 421 may obtain the outgoing data generated by the LP-FAST applications 301 via the bus interface controller 470. Depending on the size of the outgoing data, the data divider module 421 may divide the outgoing data into one or more outgoing packets that are suitably sized for network transmission. In various embodiments, the data divider module 421 may also group one or more outgoing data into a single outgoing packet.

In various embodiments, the data packetization module 423 may packetize the one or more outgoing packets based on the transmission protocols. In one example, the data packetization module 423 may packetize the outgoing data based on Real Time Protocol (RTP), User Data Protocol (UDP) and/or IP. The data packetization module 423 may packetize the outgoing packets based on other network transmission protocol. The packetized data may be forwarded to a transmitter, such as the data sender 350 of FIG. 3, for transmission over the wireless network.

In various embodiments, the data depacketization module 428 may depacketize incoming packets received from a receiver, such as the data receiver 360 of FIG. 3, and provide the depacketized incoming packets to the data combiner module 426. The data depacketization module 428 may obtain incoming packets from the data receiver 360 based on the transmission task stored in the task registry 425. In one example, the data depacketization module 428 may depacketize the incoming packets based on UDP/IP. The data depacketization module 428 may check for completeness of the depacketized incoming data under the RTP, before the incoming data are forwarded to the data combiner module 426. In various embodiments, the data depacketization module 428 may depacketize incoming packets based on other network transmission protocol.

In various embodiments, the data combiner module 426 may combine and/or split the incoming packets into incoming data suitably sized for the LP-FAST applications 301 to process. The data combiner module 426 may provide the combined incoming data to the LP-FAST applications 301 via the bus interface controller 470.

In various embodiments, the data compression module 422 may compress the outgoing packets, and provide the compressed outgoing packets to the data packetization module 423. In various embodiments, the data decompression module 427 may decompress the incoming packets and provide the incoming packets to the data combiner module 426. In various embodiments, the data compression module 422 may compress the outgoing data prior to the data divider module 421 dividing the outgoing data, and the data decompression module 427 may likewise decompress the incoming data after the data combiner module 426 combining the incoming data.

In various embodiments, the data manipulator 420 may further include data encryption module and data decryption module (not shown in FIG. 4). The data encryption module may encrypt the outgoing data generated by the LP-FAST applications 301, and the data decryption module may decrypt incoming data designated to the LP-FAST applications 301.

In various embodiments, the task management module 424 may determine whether the data manipulator 420 contains any unused transmission channel based on the records in the task registry 425. If a transmission channel is found available in the task registry 425, the task management module 424 may notify the data divider module 421 to obtain the outgoing data through the bus controller interface utilizing this transmission channel. The transmission channel may support directional or bi-directional communication. The data manipulator 420 may have more than one transmission channels. The exact number of transmission channels supported by the data manipulator 420 may be configured based on specific mobile terminals. In various embodiments, the task management module 424 may notify the main processor that one or more transmission channels are available. And the main processor may, upon receiving such notification, issue the transmission command to transmit the outgoing data generated by the LP-FAST applications 301. If no transmission channel is available, the main processor may put the transmission on hold, or transmit the outgoing data via external transmission stacks, such as external transmission stacks 308 of FIG. 3.

In various embodiments, the bus interface controller 470 may transmit the outgoing data generated by the LP-FAST applications 301 to the data manipulator 420, and may provide the incoming data from the data manipulator 420 to the LP-FAST applications 301. In various embodiments, the bus interface controller 470 may obtain the outgoing data generated by the LP-FAST applications 301 from a data area associated with the main processor of the mobile terminal, and may provide the incoming data to the LP-FAST applications 301 by transmitting the incoming data in the data area associated with the main processor.

In various embodiments, the bus interface controller 470 may be replaced by some other communication means, such as shared memory.

In various embodiments, the data manipulator 420 may include one or more storage units, such as buffers, caches, or other types of memory that is suitable for storing information transmitted between various components of the data manipulator 420, such as between the data divider module 421 and the data packetization module 423.

Referring back to FIG. 3, in various embodiments, the packet interceptor 340 may be coupled to the external transmission stacks 308. In various embodiments, the external transmission stacks 308 may be based on a layered model similar to TCP/IP, which may include an application layer 304, a transportation layer 305, an IP layer 306 and a link layer 307. The external transmission stacks 308 may co-exist on the mobile terminal 200 with the LP-FAST engine 300 so that the mobile terminal 200 is compatible with legacy mobile applications that are not designed to use the LP-FAST engine 300, such as the non LP-FAST applications 303. In various embodiments, the link layer 307 may include a network interface card (NIC) and a NIC driver.

In various embodiments, the packet interceptor 340 may be configured to intercept outgoing packets generated by the non LP-FAST applications 303. In various embodiments, the packet interceptor 340 may be coupled to the NIC of the link layer 307 and act as a separate NIC driver for the link layer 307. The packet interceptor 340 may intercept outgoing packets from the non LP-FAST applications 303 by configuring the routing table of the external transmission stacks 308 so that the packet interceptor 340 may have priority over all other NIC drivers of the link layer 307. The packet interceptor 340 may route the intercepted packets to the traffic shaper 330. As such, both the outgoing packets generated by the non LP-FAST applications 303 and the outgoing packets generated by the LP-FAST applications 301 may be managed and delivered by the LP-FAST engine 300. This may reduce the negative impact on the QoS of the LP-FAST applications 301 due to the existence of the non LP-FAST applications 303 on the same mobile terminal.

In various embodiments, the packet interceptor 340 may receive incoming packets from the data receiver 360. The packet interceptor 340 may determine whether the incoming packets are designated for the LP-FAST applications 301 or the non LP-FAST applications 303. For the incoming packets designated for the LP-FAST applications 301, the packet interceptor 340 may route these packets to the data manipulator 320 for further processing and delivery to the LP-FAST applications 301. For the incoming packets designated for the non LP-FAST applications 303, the packet interceptor 340 may route these packets to the external transmission stacks 308, for example, to the IP layer 306, which in turn may deliver these packets to the non LP-FAST application 303. In various embodiments, the packet interceptor 340 may differentiate the incoming packets designated for the LP-FAST applications 301 or the non LP-FAST applications 303 by the designation port numbers of the incoming packets.

In various embodiments, the packet interceptor 340 may apply one or more priority settings on the incoming/outgoing packets for the LP-FAST applications 301 and/or the non LP-FAST applications 303 to improve or maintain their respective QoS.

In various embodiments, the traffic shaper 330 may reorder the incoming/outgoing packets in a service aware, bandwidth aware, and power-consumption aware fashion. The traffic shaper 330 may receive information related to QoS of the LP-FAST applications 301 as embedded in the incoming/outgoing packets, or via the data manipulator 320, the data classifier 310, and/or from the LP-FAST applications 301 directly via bus interface controller 370 or some other means. The traffic shaper 330 may receive the outgoing packets from the data manipulator 320 (for the LP-FAST applications 301) and the packet interceptor 340 (for the non LP-FAST applications 303), and may receive the incoming packets from the data interceptor 340. The traffic shaper 330 may rearrange the delivery orders of the incoming/outgoing packets based on the information related to QoS of the LP-FAST applications 301. For example, the traffic shaper 330 may reorder outgoing packets so that the outgoing packets generated by applications with higher QoS requirements may be delivered over the wireless network prior to outgoing packets generated by applications with lower QoS requirements, even though the outgoing packets may be first generated by applications with lower QoS requirements. Similarly, the traffic shaper 330 may reorder incoming packets so that the incoming packets designated for applications with higher QoS requirements may be delivered prior to the incoming packets designated for applications with lower QoS requirements.

In various embodiments, for packets to/from the non LP-FAST applications 303 that do not have associated QoS information, the traffic shaper 330 may inspect these packets for known protocols, and may associate various QoS levels to these packets. In various embodiments, the traffic shaper 330 may or may not need to inspect each individual packet. The traffic shaper 330 may selectively inspect one or more of these packets and associate QoS levels for a stream of these packets. In various embodiments, the traffic shaper 330 may selectively associate different QoS levels to various packets to/from the non LP-FAST applications 303 based on their respective protocols, or may associate all of these packets the same QoS level as best-effort packets, or a combination of the two.

In various embodiments, the traffic shaper 330 may receive bandwidth status updates from the data sender 350 and power status updates from the external power monitors. The traffic shaper 330 may delay the time of submitting a packet to the data sender 350 for transmission based on the information related to QoS of the LP-FAST applications 301, the bandwidth information and the power information. In various embodiments, the traffic shaper 330 may provide both flow based and/or in-flow QoS control of the incoming/outgoing packets.

Some mobile terminals may drop connections immediately after each data transmission to save power. However, frequent connect/disconnect may cause congestion in the signaling channel, which may lead to connection failures. In various embodiments, the traffic shaper 330 may group scattered packets into bursts to enable the transmitter, such as the transmitter 214 illustrated in FIG. 2, to enter power-saving sleep mode longer and more regularly. The traffic shaper 330 may reduce the overhead of frequent connect/disconnect, thereby reducing network congestion and connection failures.

In various embodiments, the traffic shaper 330 may also get status feedback (e.g., success or failure) from the data sender 350 on transmission of packets. The traffic shaper 330 may collect such information over time and analyze such information to produce real-time bandwidth information, which may be provided to the data manipulator 320, periodically or on-demand.

In various embodiments, the data sender 350 may provide outgoing packets to external wireless network device drivers 302. The external wireless device drivers 302 may be based on WiFi, or IEEE 802.11 standard (IEEE std. 802.11-2007, published in Mar. 20, 2007), 3rd Generation Partnership Project (3GPP), Worldwide Interoperability for Microwave Access (WiMAX), etc. The external wireless network device drivers 302 may be software device drivers or hardware device drivers. In various embodiments, the data sender 350 may detect status of the wireless network, and may re-transmit the outgoing packets if the outgoing packets were not transmitted successfully.

In various embodiments, the data receiver 360 may receive incoming packets from the external wireless network device drivers 302. The data receiver 360 may forward the incoming packets to the packet interceptor 340. In various embodiments, the data receiver 360 may request the sender of the incoming packets to re-transmit one or more of the incoming packets based on feedback from various components of the LP-FAST engine 300, such as the data manipulator 320.

In various embodiments, various components of the LP-FAST engine 300, such as the data classifier 310, the data manipulator 320, the traffic shaper 330, the packet interceptor 340, the data sender 350 and the data receiver 360 may be implemented in hardware, software, or a combination thereof. In various embodiments, various components of the LP-FAST engine 300 may be implemented as a virtual machine on the mobile terminal 200.

FIG. 5 is a flow diagram illustrating a portion of an example operation of the LP-FAST engine 300 processing the outgoing data in accordance with various embodiments. The LP-FAST engine 300 may receive the outgoing data generated by the LP-FAST applications 301 in block 510 via the bus interface controller 370 or some other means. The data classifier 310 may classify the received outgoing data in block 520. The data manipulator 320 may perform operations such as compression, decompression, encryption, decryption, packetization and depacketization in block 530. The packet interceptor 340 may intercept outgoing data generated by the non LP- FAST applications 303 and forward such data to the traffic shaper 330 in block 560. The traffic shaper 330 may reorder or rearrange the outgoing data generated by both the LP-FAST applications 301 and the non LP-FAST applications 303 in block 540. The data sender 350 may provide the reorganized outgoing data to the wireless network device 302 for transmission in block 550.

FIG. 6 is a flow diagram illustrating a portion of an example operation of the LP-FAST engine 300 processing the incoming packets in accordance with various embodiments. The data receiver 360 may receive the incoming packets in block 610. The packet interceptor 340 may determine which applications the incoming packets are designated for in block 620. If the data are designated for the non LP-FAST applications 303, then the packet interceptor 340 may forward, provide, or otherwise make available the incoming packets to the external transmission stacks 308 in block 630, which, in turn, may deliver the incoming packets to the non LP-FAST applications 303. If the incoming packets are designated for the LP-FAST applications 301, then packet interceptor 340 may deliver the incoming packets to the data manipulator 320, at which point the data manipulator 320 may perform operations on the incoming packets to produce an incoming data that is in a form readily acceptable to the LP-FAST applications 301 in block 640. The incoming data may be provided to the LP-FAST applications 301 in block 650, by the bus interface controller 370 or some other means.

Figure 7:
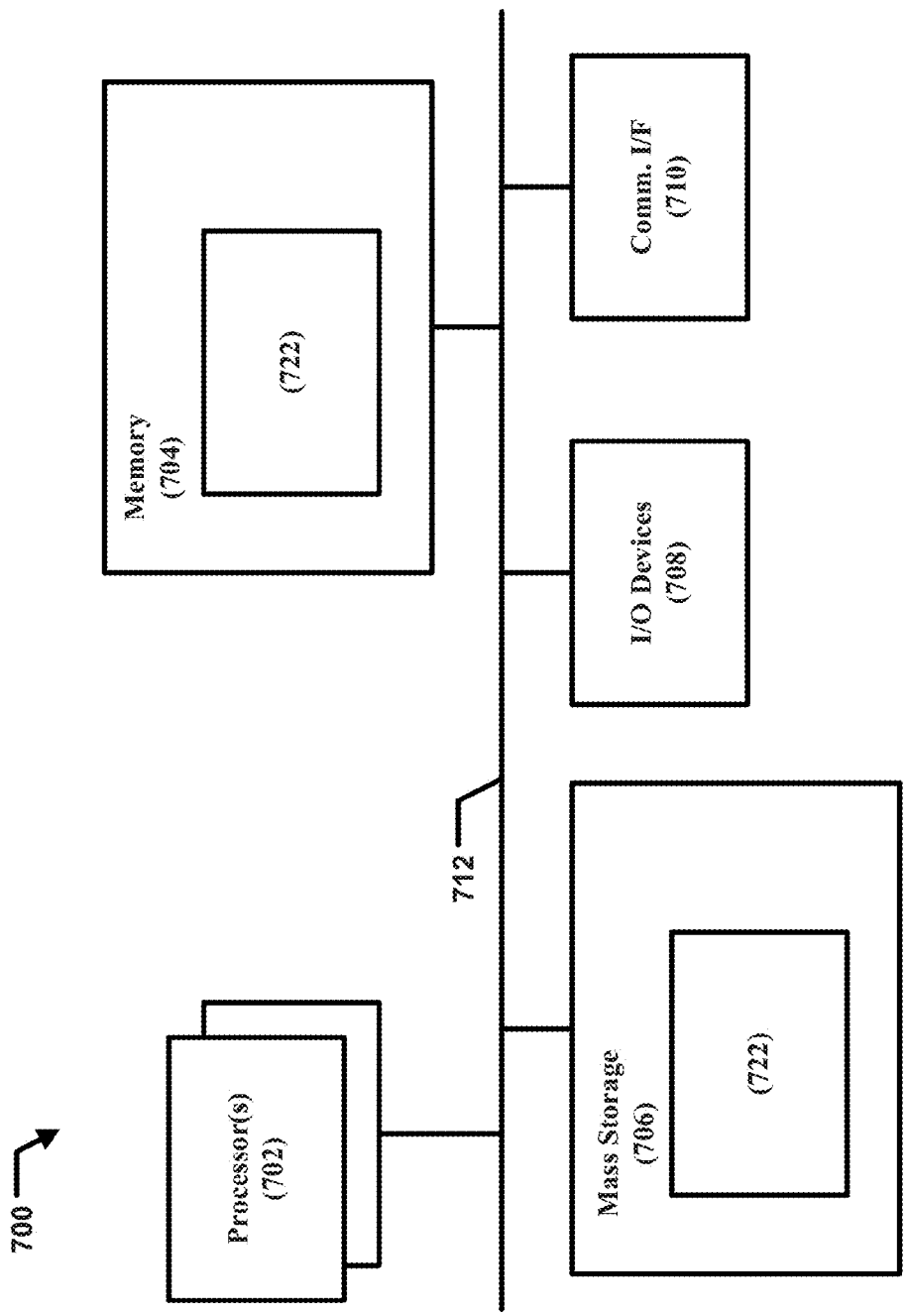
FIG. 7 illustrates an example computer system suitable for use to practice various embodiments of the present invention.

FIG. 7 illustrates an example computer system suitable for use to practice various embodiments of the present invention. As shown, computing system 700 may include a number of processors or processor cores 702, a system memory 704, and a communication interface 710. For the purpose of this application, including the claims, the terms "processor" and "processor cores" may be considered synonymous, unless the context clearly requires otherwise. The communication interface 710 may contain at least part of the LP-FAST engine as previously illustrated.

Additionally, computing system 700 may include tangible non-transitory mass storage devices 706 (such as diskette, hard drive, compact disc read only memory (CDROM) and so forth), input/output devices 708 (such as keyboard, cursor control and so forth). The elements may be coupled to each other via system bus 712, which represents one or more buses. In the case of multiple buses, they are bridged by one or more bus bridges (not shown).

Each of these elements may perform its conventional functions known in the art. In particular, system memory 704 and mass storage 706 may be employed to store a working copy and a permanent copy of the programming instructions implementing one or more operating systems, drivers, applications, and so forth, herein collectively denoted as 722.

The permanent copy of the programming instructions may be placed into permanent storage 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The remaining constitution of these elements 702-712 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. An apparatus comprising:
   a transmission engine, hosted by a mobile terminal of a wireless network, wherein the transmission engine comprises:
   a data classifier configured to:
   receive, from a first application operating on the mobile terminal, a first plurality of packets generated and provided by the first application, and
   receive, from the first application, information related to a quality of service (QoS) parameter of the first application;
      a data interceptor configured to intercept a second plurality of packets generated by a second application operating on the mobile terminal, wherein the second application is other than the first application, and wherein the second application is not configured to provide the second plurality of packets nor to provide information related to a QoS parameter of the second application to the transmission engine; and
   a traffic shaper coupled to the data classifier and the data interceptor, and configured to:
      associate a QoS parameter with the second application; and
      reorder the first and second plurality of packets, based on the information related to the QoS parameter of the first application and the QoS parameter associated with the second application, before forwarding the first and second plurality of packets to a transmitter of the mobile terminal, coupled with the transmission engine, to transmit over the wireless network,
   wherein the mobile terminal has a body dimensioned to enable portable usage of the mobile terminal as a client device.

2. The apparatus of claim 1, wherein the data classifier is further configured to categorize respective ones of the first plurality of packets based on the information related to the QoS parameter of the first application, and the traffic shaper is further configured to group the reordered first plurality of packets into one or more bursts of packets based at least in part on the information related to the QoS parameter of the at least one of first application, and wherein the transmission engine further comprises:
   a data sender coupled to the traffic shaper and configured to provide the one or more bursts of packets to the transmitter of the mobile terminal to transmit the one or more bursts of packets over the wireless network.

3. The apparatus of claim 1, wherein the transmission engine further comprises a data receiver configured to receive another plurality of packets designated for the first application from the wireless network, via a receiver of the mobile terminal, coupled with the transmission engine.

4. The apparatus of claim 1, wherein the transmission engine further comprises a data manipulator configured to perform at least one of compression, decompression, encryption, decryption, packetization or depacketization of respective ones of the first and second plurality of packets.

5. The apparatus of claim 4, wherein the data manipulator is configured to perform at least one of compression, decompression, encryption, decryption, packetization or depacketization of respective ones of the first and second plurality of packets based on bandwidth usage and computational resource consumption of the first application.

6. The apparatus of claim 1, wherein the traffic shaper is further configured to receive a notification of battery status of the mobile terminal, and reorder the first and second plurality of packets further in view of the battery status.

7. A method comprising:

receiving, by a data classifier of a transmission engine hosted by a mobile terminal of a wireless network, from a first application operating on the mobile terminal, a first plurality of outgoing packets generated and provided by the first application, the first plurality of outgoing packets to be transmitted over the wireless network by a transmitter of the mobile terminal;

receiving, by the data classifier, from the first application, information related to quality of service (QoS) requirement of the first application;

intercepting, by a packet interceptor of the transmission engine, a second plurality of packets generated by a second application other than the first application, the second application not providing the data classifier with the second plurality of packets nor providing the data classifier with a QoS requirement of the second application;

associating a QoS parameter with the second application; and reordering, by a traffic shaper of the transmission engine, the first and second plurality of outgoing packets, based on the information related to the QoS parameter of the first application and the QoS parameter associated with the second application, before forwarding the first and second plurality of packets to the transmitter to transmit over the wireless network.

8. The method of claim 7, further comprising:

grouping, by the traffic shaper, the first plurality of outgoing packets into one or more bursts of packets based at least in part on the information related to the QoS parameter of the first application; and providing, by the traffic shaper, the one or more bursts of packets to the transmitter to transmit the one or more bursts of packets over the wireless network.

9. The method of claim 8, further comprising:

categorizing, by the data classifier, respective ones of the first plurality of outgoing packets generated by the first application based on the information related to the QoS parameter of the first application.

10. The method of claim 8, further comprising:

receiving, by the traffic shaper, notification about available bandwidth and available battery power of the mobile terminal;

reducing, by the traffic shaper, transmission data rate of the first application in response to a determination that the available bandwidth of the mobile terminal is less than a predetermined bandwidth threshold; and reducing, by the traffic shaper, computational resource usage and the transmission data rate of the application in response to a determination that the available battery power is less than a predetermined power threshold.

11. The method of claim 8, further comprising:

receiving, by a data manipulator of the transmission engine, a plurality of incoming packets designated for the first application; and compressing, encrypting and packetizing, by the data manipulator, respective ones of the first plurality of outgoing packets before transmitting the respective ones of the plurality of outgoing packets over the wireless network; and decompressing, decrypting and depacketizing, by the data manipulator, respective ones of the plurality of incoming packets before providing the respective ones of the plurality of incoming packets to the first application.

* * * * *